(12) United States Patent
Bimbaum et al.

(10) Patent No.: US 7,984,601 B2
(45) Date of Patent: Jul. 26, 2011

(54) PROFILED RAIL

(75) Inventors: Ulrich Bimbaum, Epfenhausen (DE); Lukas Mundwiler, Hoelstein (CH)

(73) Assignee: Hilti Aktiengesellschaft, Schaan (LI)

( * ) Notice: Subject to any disclaimer, the term of this patent is extended or adjusted under 35 U.S.C. 154(b) by 554 days.

(21) Appl. No.: 12/154,926

(22) Filed: May 27, 2008

(65) Prior Publication Data

US 2008/0295452 A1    Dec. 4, 2008

(30) Foreign Application Priority Data

May 30, 2007  (DE) .......................... 10 2007 000 296

(51) Int. Cl.
*E04C 3/00* (2006.01)
*E04C 2/52* (2006.01)
*E04H 12/00* (2006.01)

(52) U.S. Cl. .......... 52/846; 52/839; 52/650.1; 52/220.1; 52/836; 52/843

(58) Field of Classification Search .................... 52/831, 52/839, 840, 710, 634, 650.1, 220.1, 836, 52/843, 846; D25/119, 125; 174/480, 481, 174/68.1, 68.3, 491, 72 R; 248/342, 343
See application file for complete search history.

(56) References Cited

U.S. PATENT DOCUMENTS

| | | | | |
|---|---|---|---|---|
| 1,552,474 A * | 9/1925 | Claude | ............................ | 52/634 |
| 1,682,202 A * | 8/1928 | Vaughn | ............................ | 52/636 |
| 2,177,277 A * | 10/1939 | Burke | ............................ | 52/634 |
| 2,375,513 A * | 5/1945 | Bach | ............................ | 248/59 |
| D158,461 S * | 5/1950 | Hammerly | .................... | D25/119 |
| 3,547,385 A * | 12/1970 | Kindorf et al. | .................. | 248/62 |
| 3,854,192 A * | 12/1974 | O'Konski | ..................... | 228/135 |
| 4,793,113 A * | 12/1988 | Bodnar | ........................ | 52/481.1 |
| 5,042,213 A * | 8/1991 | Menchetti et al. | ........... | 52/481.1 |
| 5,118,069 A * | 6/1992 | Muhlethaler | ................. | 248/613 |
| 5,157,883 A * | 10/1992 | Meyer | ............................. | 52/357 |
| 5,351,926 A * | 10/1994 | Moses | ........................ | 248/354.5 |
| 5,527,625 A * | 6/1996 | Bodnar | ........................ | 428/595 |
| 5,660,012 A * | 8/1997 | Knudson | ........................ | 52/241 |
| 5,737,801 A * | 4/1998 | Flood | ............................... | 16/30 |
| 5,865,008 A * | 2/1999 | Larson | ........................... | 52/690 |
| 5,899,041 A | 5/1999 | Durin | | |
| 5,927,041 A | 7/1999 | Sedlmeier et al. | | |
| 5,970,679 A * | 10/1999 | Amore | ............................ | 52/846 |
| 6,073,414 A * | 6/2000 | Garris et al. | ................... | 52/694 |
| 6,088,988 A * | 7/2000 | Sahramaa | ....................... | 52/639 |

(Continued)

FOREIGN PATENT DOCUMENTS

CH      419 549      8/1966

(Continued)

*Primary Examiner* — Robert Canfield
*Assistant Examiner* — Charissa Ahmad
(74) *Attorney, Agent, or Firm* — Abelman, Frayne & Schwab

(57) ABSTRACT

A profiled rail has two opposite side walls (13) at least one connection wall (16) for connecting the side walls (13), first and second openings (17, 37; 27, 47) for passing therethrough a connection element (6) and having, respectively, first and second opening widths (B; F; C; G) measured in a direction perpendicular to a longitudinal profile axis (12) of the profiled rail, with a minimal distance (A; E) between the opposite wall sections (14; 34) of the side walls (13; 33), which is measured in the direction perpendicular to the longitudinal profile axis (12) of the profiled rail, at most corresponding to the opening width of (B; F; C; G) the first and second openings (17, 37; 27; 47).

4 Claims, 1 Drawing Sheet

U.S. PATENT DOCUMENTS

| | | | | |
|---|---|---|---|---|
| 6,333,461 | B1 * | 12/2001 | Marcou et al. | 174/68.3 |
| 6,374,558 | B1 * | 4/2002 | Surowiecki | 52/241 |
| 6,660,938 | B2 * | 12/2003 | Herb et al. | 174/68.1 |
| 6,817,155 | B2 * | 11/2004 | Larson | 52/690 |
| 7,318,302 | B2 * | 1/2008 | Oppermanm | 52/633 |
| D611,673 | S * | 3/2010 | Andrews et al. | D34/35 |
| 7,743,578 | B2 * | 6/2010 | Edmondson | 52/653.1 |
| 7,866,112 | B2 * | 1/2011 | Edmondson | 52/650.1 |
| 7,896,318 | B1 * | 3/2011 | Gibbs et al. | 256/67 |
| 2003/0014935 | A1 * | 1/2003 | Bodnar | 52/481.1 |
| 2003/0042033 | A1 * | 3/2003 | Herb et al. | 174/48 |
| 2003/0159397 | A1 * | 8/2003 | Birnbaum | 52/733.2 |
| 2004/0050011 | A1 | 3/2004 | Larson | |
| 2008/0006002 | A1 * | 1/2008 | Strickland et al. | 52/737.6 |
| 2009/0320395 | A1 * | 12/2009 | Strickland et al. | 52/289 |
| 2010/0037551 | A1 * | 2/2010 | Bodnar | 52/634 |

FOREIGN PATENT DOCUMENTS

| | | |
|---|---|---|
| DE | 20 2005 006 528 U1 | 10/2005 |
| DE | 102006039446 A1 * | 4/2008 |
| EP | 583616 A1 * | 2/1994 |
| EP | 1505705 A1 | 2/2005 |
| FR | 2044101 | 2/1971 |
| GB | 956562 | 4/1964 |
| GB | 2209632 A | 5/1989 |
| JP | 04357232 A * | 12/1992 |

* cited by examiner

PROFILED RAIL

BACKGROUND OF THE INVENTION

1. Field of the Invention

The present invention relates to a profiled rail for being suspended from a constructional component and having two opposite side walls having opposite wall sections respectively, a first connection wall for connecting the two side walls with each other, and having a first opening for passing therethrough a connection element that secures the profiled rail on the constructional component, with the first opening having a first opening width measured in a direction perpendicular to a longitudinal profile axis of the profiled rail, and a second opening located opposite the first opening for passing through the connection element and having a second opening width measured in a direction perpendicular to a longitudinal profile axis of the profiled rail.

2. Description of the Prior Art

Profiled rails of the type described above are used for attachment of different installations such as tubular conduits, cable channels, air ducts, or aeration installations. To this end, the profiled rails are secured directly to a constructional component, such as a ceiling, a wall etc. or at a distance therefore with fastening or attachment elements such as threaded rods, screws, etc.

German Utility Model DE 20 2005 006 528 U1 discloses a circumferentially closed profiled rail adjacent side walls of which have dovetail-shaped recesses and which have opposite wall sections. Connection walls, which are spaced from each other and connect the side walls with each other, have respective opposite through-openings for passing an attachment element therethrough. The distance between the opposite wall sections of the side walls and which is measured in a direction perpendicular to the longitudinal profile axis is greater than the opening width of the through-openings likewise measured in the direction transverse to the profile longitudinal axis.

The drawback of the above-described rail consists in that during the insertion of the attachment element through one of the openings for securing the profiled rail, the attachment element can engage an edge of the opposite opening which substantially increases mounting costs, in particular, at an overhead mounting of a profiled rail on a ceiling that forms the structural component. If a diameter of the attachment element is correspondingly smaller than the opening width of the through-openings, a larger clearance is formed in the insertion direction. Therefore, in this case additional costs are required in order to prevent tilting of the profiled rail, which is spaced from the constructional component, in a direction transverse to the profile axis under a load.

Swiss Publication CH 419 549 discloses a C-shaped profiled rail the connection wall of which that connects the side walls, has a plurality of first openings for passing an attachment element therethrough. The profiled rail further has a mounting opening located opposite the first opening and extending over the entire longitudinal extent of the profiled rail. The mounting opening forms a second opening for passing the attachment element and has a second opening width that is measured in the direction perpendicular to the longitudinal profile axis.

In this rail likewise, the distance between the opposite wall sections of the side walls measured in the direction perpendicular to the longitudinal profile axis of the profiled rail is greater than the opening width of the first opening and of the mounting opening.

The drawback of the rail of the Swiss publication consists in that with this rail, likewise during passing of the attachment element through the through-openings, it can engage the edge of the opposite through-opening. Because the two opposite through-openings have different opening widths, there exists a danger that at mounting of the profiled rail at a distance from the constructional component, the profiled rail would tilt in a direction transverse to the profile axis under load unless expensive measures are undertaken to prevent tilting.

Accordingly, an object of the present invention is to provide a profiled rail suitable for different types of suspension from a constructional component and which can be easily mounted on the constructional component.

SUMMARY OF THE INVENTION

This and other objects of the present invention, which will become apparent hereinafter, are achieved by providing a profiled rail of the type described above in which a minimal distance between the opposite wall sections of the side walls measured in the direction perpendicular to the longitudinal profile axis of the profiled rail at most corresponds to the opening width of the first and second openings.

In the inventive profiled rail, the opposite wall sections of the side walls form, during passing of the attachment element, a sidewise guide for the attachment element in the interior of the profiled rail. The sidewise guide insures passing of the attachment element without hooking or tilting. Further, the sidewise guide prevents tilting of the profiled rail that is mounted on a constructional component, when the profiled rail is loaded transverse to the profile axis. Advantageously, the minimal distance between the opposite wall sections of the side walls to each other is smaller than opening width of the openings measured in a direction perpendicular to the longitudinal profile axis.

Advantageously, the minimal distance between the opposite wall sections of the side walls at most corresponds to a smaller opening width of the located opposite each other, first and second openings measured in a direction perpendicular to the longitudinal profile axis. Even when the two openings have different opening widths, an advantageous side guidance of the attachment element during its passing through the profiled rail, is insured.

Advantageously, at least the first through-opening or openings is (are) formed as an elongate opening(s). This makes possible adjustment of the profiled rail with respect to the inserted attachment element in direction of the grater opening width. Advantageously, both the first and second openings are formed as elongate openings, with the elongate openings advantageously being aligned in the same direction in which the longitudinal axis of the profiled rail extends.

Advantageously, there is provided a second connection wall spaced from the first connection wall for connecting the two side walls, with the first opening being formed in the first connection wall and the second opening being formed in the second connection wall. The connection walls and the side walls form together a circumferentially closed profile, so that the profiled rail has an advantageous flexural and torsional strength.

Advantageously, at least one of the openings has a collar extending into the interior of the profiled rail. The collar provides an additional sidewise guide for passing the attachment element through the profiled rail, further facilitating mounting of the profiled rail on a constructional component. The collar further compensates, at least partially, the reduction of static values caused by partial weakening of the corresponding connection wall due to the through-opening(s) formed therein. The collar is preferably formed by a drawn-through opening.

Advantageously, the collar has a section at least some portions of which abut an inner side of the side walls, providing support for the side walls. Thereby, the free effective length of the side walls is shortened. This is particular advantageous when the profiled rail is formed off a thin material and is subjected to a buckling and bending load.

Advantageously, the collar section sidewise abuts the inner sides of the corresponding connection wall, over its entire height over the plane define by the corresponding connection wall. Alternatively, the free end of the corresponding collar section is aligned with respect to the corresponding side walls, supporting the side wall essentially at contact points.

Advantageously, the inventive profiled rail is formed of metal and, more advantageously of sheet metal by a stamping and bending process and/or a rolling process. This insures a simple and economical production of the inventive profiled rail.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

DETAILED DESCRIPTION OF THE PREFERRED EMBODIMENTS

Figure 1:
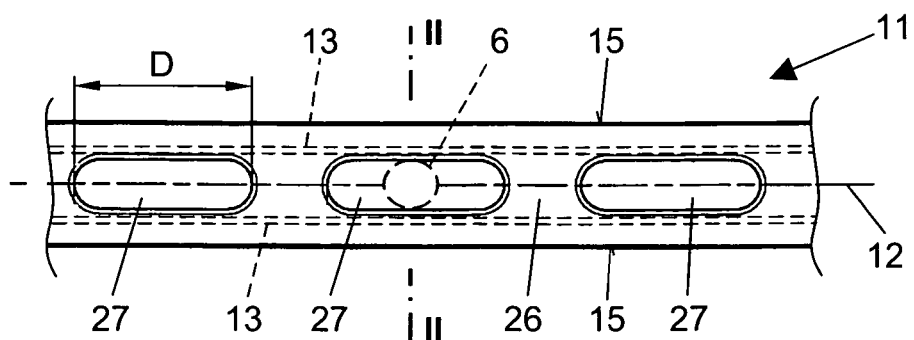
FIG. 1 plan view of a profiled rail according to the present invention.
Figure 2:
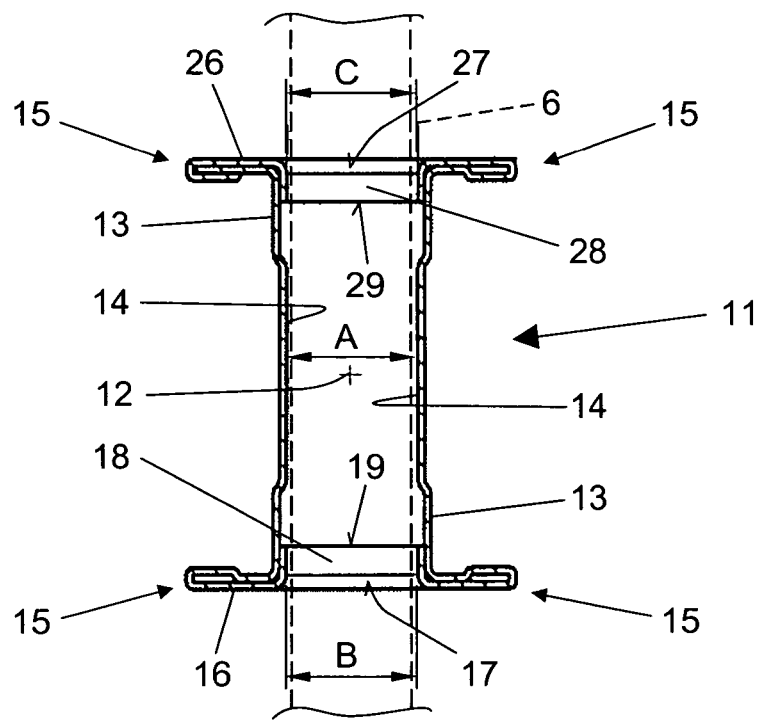
FIG. 2 a cross-sectional view of the profiled rail shown in FIG. 1 along line II-II at an increased, in comparison with FIG. 1 scale.

A profiled rail 11, which is shown in FIGS. 1-2, is formed of sheet metal and is designed for being suspended from a constructional component (not shown) with an attachment element 6. The profiled rail 11 has a longitudinal profile axis 12, two opposite side wall section 14, and two connection walls 16 and 26 connecting both side walls 13. The connection walls 16, 26 extend substantially perpendicular to planes in which the side walls 13 are located. Because of accumulation of material on edges 15 of the profiled rail 11, the profiled rail 11 even with reduced sheet metal thickness has an increased flexural and torsional strength in comparison with at least partially circumferentially closed profiled rail without accumulation of material on the edges.

In the first connection wall 16, there is provided a first through-opening 17 having an opening width B in a direction perpendicular to the longitudinal profile axis 12, and in the second connection wall 26, there is provided a second through-opening 27 having an opening width C in a direction perpendicular to the longitudinal profile axis 12. The through-openings 17 and 27 are provided for passing of the attachment element 6 through the profiled rail 11. The opening width B of the first opening 17 corresponds to the opening width C of the second opening 27. The through-openings 17 and 27 are formed as elongate openings a large opening width D of which extends in a direction parallel to the longitudinal profile axis 12. The first and second openings 17 and 27 have a congruent shape in the projection transverse to the longitudinal profiled rail 12.

The through-openings 17 and 27 further have collars 18 and 28, respectively, projecting into the interior of the profiled rail 11, with free edges 19, 29 of the collars 18, 28, respectively, facing each other.

A minimal distance A between the opposite wall sections 14 of the side walls 13, which is measured in a direction perpendicular to the longitudinal profile axis 12, corresponds maximum to the opening width B or C of the respective through-openings 17 or 27 likewise measured in a direction perpendicular to the longitudinal profile axis 12.

Figure 3:
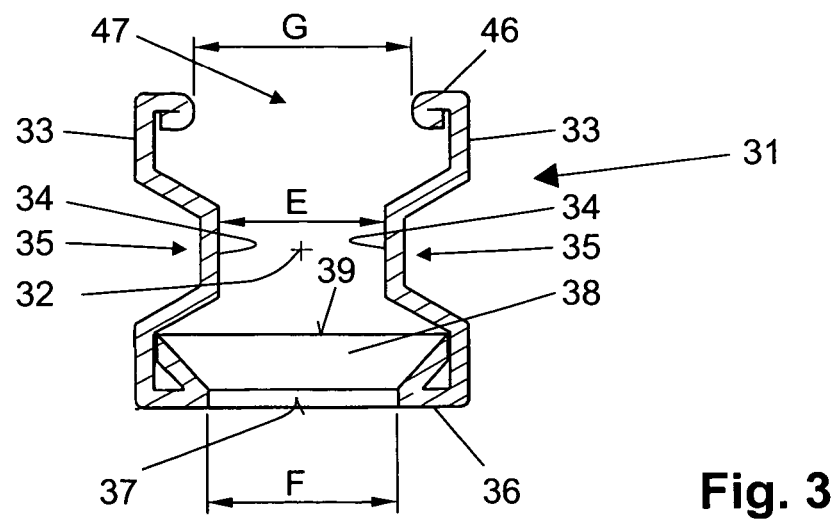
FIG. 3 a cross-sectional view of a second embodiment of a profiled rail according to the present invention.
In the drawings, the same elements are designated with the same reference numerals

A second embodiment of the inventive profiled rail, rail 34 is formed, as shown in FIG. 3, as a C-shaped mounting rail. The profiled rail 31 has, on its side 46, a mounting opening that extends over the entire longitudinal extent of the side 46 and is formed as a second through-opening 47 with an opening width in the direction perpendicular to the longitudinal profile axis 32. In a side wall 33 of the connection wall 36, there is provided a plurality of spaced from each other, elongate holes in form of first through-openings 37 with an opening width F measured in the direction perpendicular to the longitudinal profile axis 32. The opening width F of the first through-openings 37 is smaller than the opening width G of the second through-opening 47. The first through-openings 37 each has a collar 38. The free edges 39 of the collars 38 lie partially on the inner side of the side walls 33, being supported, e.g., against respective beads 35 provided in side walls 33.

A minimal distance E between opposite wall sections 34 of the side walls 33, which is measured in a direction perpendicular to the longitudinal axis 32, corresponds at most of the opening width F of the first openings 37 measured in the direction perpendicular to the longitudinal profile axis 32.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:
1. A profiled rail for being suspended from a constructional component, comprising:
two opposite side walls (13; 33) having opposite wall sections (14; 34) respectively;
a first connection wall (16; 36) for connecting the two side walls (13; 33) with each other;
a first opening (17; 37) formed in the first connection wall (16; 36) for passing therethrough a connection element (6) that secures the profiled rail on the constructional component, the first opening (17; 37) having a first opening width (B; F) measured in a direction perpendicular to a longitudinal profile axis (12) of the profiled rail;
a second opening (27, 47) located opposite the first opening (17, 37) for passing therethrough the connection element (6) and having a second opening width (C; G) measured in a direction perpendicular to a longitudinal profile axis (12) of the profiled rail, wherein a minimal distance (A, E) between the opposite wall sections (14; 34) of the side walls (13; 33) measured in the direction perpendicular to the longitudinal profile axis (12) of the profiled rail at most corresponds to the opening width of the first and second openings (17, 27, 37, 47), wherein at least one of the first and second openings (17, 27; 37) has a collar (18, 28; 38) extending into the interior of the profiled rail and having a section at least some portions of which abut an inner side of the side walls (13).

2. A profiled rail according to claim 1, wherein the minimal distance (A; E) corresponds to a smaller opening width (B, C, F, G) than the located opposite each other, first and second openings (17, 27; 37, 47) measured in a direction perpendicular to the longitudinal profile axis (12; 32).

3. A profiled rail according to claim 1, wherein at least the first opening (17, 37) is formed as an elongate opening.

4. A profiled rail according to claim 1, further comprising a second connection wall (26) spaced from the first connection wall (16) for connecting the two side walls (13), and wherein the first opening (17) is formed in the first connection wall (16), and the second opening (27) is formed in the second connection wall (26).

* * * * *